United States Patent [19]

Jones et al.

[11] 3,947,556

[45] Mar. 30, 1976

[54] ZINC COMPLEXES OF BASIC ALUMINUM CHLORIDES AND METHODS OF MAKING SAME

[75] Inventors: John L. Jones, North Plainfield; Andrew M. Rubino, New Providence, both of N.J.; Charles B. Lindahl, Sand Springs, Okla.

[73] Assignee: Armour Pharmaceutical Company, Chicago, Ill.

[22] Filed: June 3, 1975

[21] Appl. No.: 583,370

Related U.S. Application Data

[62] Division of Ser. No. 164,434, July 20, 1971.

[52] U.S. Cl. .................... 423/463; 423/462; 424/47
[51] Int. Cl.$^2$. C01G 25/04; C01F 7/00; C01G 9/00; C01G 25/00
[58] Field of Search .......................... 423/463, 462

[56] References Cited
UNITED STATES PATENTS

| | | | |
|---|---|---|---|
| 2,492,085 | 12/1949 | Andersen | 423/462 X |
| 2,854,382 | 9/1958 | Grad | 423/462 UX |
| 2,906,668 | 9/1959 | Beekman | 423/463 X |
| 3,009,771 | 11/1961 | Grote | 423/463 |
| 3,405,153 | 10/1968 | Jones et al. | 423/463 X |

FOREIGN PATENTS OR APPLICATIONS

| | | | |
|---|---|---|---|
| 890,578 | 3/1962 | United Kingdom | 423/463 |

*Primary Examiner*—Edward Stern
*Attorney, Agent, or Firm*—Seidel, Gonda, & Goldhammer

[57] ABSTRACT

Alcohol soluble complexes of basic aluminum chlorides may be prepared by adding zinc bromide or chloride, or zirconyl bromide or hydroxybromide, or zinc or zirconyl mixtures of the above to an aqueous solution of five-sixths basic aluminum chloride, and drying the resulting mixture to a substantially friable solid. The complexes preferably have an Al/Zn or Al/Zr mol ratio of about 3:1 to 20:1, and the complex solids preferably contain about 12 to 30 weight percent water by Karl Fischer analysis. Such complex solids have a high degree of solubility in anhydrous alcohol and a high compatibility with halogenated hydrocarbons, thus making the complexes suitable for aerosol formulations and particularly antiperspirant compositions.

9 Claims, No Drawings

ZINC COMPLEXES OF BASIC ALUMINUM CHLORIDES AND METHODS OF MAKING SAME

This application is a division of our copending application Ser. No. 164,434, filed July 20, 1971, entitled "Zinc And Zirconium Complexes Of Basic Aluminum Chlorides And Methods Of Making Same."

The present invention relates to zirconium complexes of basic aluminum chlorides and methods of making such complexes. More particularly, the invention is directed to complexes of five-sixths basic aluminum chlorides and zinc chloride and/or bromide, or zirconyl bromide and/or hydroxybromide, which complexes are particularly suitable for use in antiperspirant compositions.

It has been known in the art for some time that aluminum compounds are among the most useful active ingredients in astringent or antiperspirant compositions and other cosmetic products. Of particular interest in this regard are the basic aluminum halides.

One of the best commercially available antiperspirants, namely, aluminum chlorhydroxide (sold under the trademark "Chlorhydrol" by Reheis Chemical Company, a division of Armour Pharmaceutical Company), has suffered from the disadvantage of insolubility in non-aqueous media, such as anhydrous alcohol, and requires the addition of water or other water-containing solvents to obtain a soluble state. This aqueous form is undesirable due to incompatibility with aerosol propellants and other ingredients, corrosion of metal valves and containers, and slow drying times.

It is also known that zinc salts and zirconium salts, such as zirconyl chloride ($ZrOCl_2$ or zirconium oxychloride) are capable of preventing or retarding the exudation of perspiration from the skin and have been used or suggested for use in antiperspirant compositions. However, the usual known zirconium salts are strongly acidic, and thus are generally not usable due to irritation of the skin and damage to clothing. Furthermore, salts of weak acids are relatively ineffective in inhibiting the flow of perspiration.

A number of solutions have been proposed to the above problems in the form of complexes which include zinc or zirconium salts and aluminum hydroxyhalides. Examples of such complexes are described in U.S. Pat. Nos. 2,814,584 and 2,814,585 for "Buffered Antiperspirant Compositions" issued to Edwin William Daley, which disclose aqueous solutions of zirconium and/or hafnium salts which are buffered with basic aluminum halides or nitrates and amino acids to render the solutions safe for antiperspirant usage. Another example is U.S. Pat. No. 2,906,668 for "Zirconyl And Aluminum Halohydroxy Complex" issued to Stewart M. Beekman, which discloses aqueous solution complexes of zirconyl halides with aluminum hydroxyhalides and a method for maintaining a high solution pH and preventing gelling.

The complexes produced according to the above patents suffer from the same disadvantages as Chlorhydrol; that is, being in aqueous solutions. Thus, in order to be commercially acceptable for use in present day aerosol antiperspirant compositions, it is generally considered to be necessary that the astringent compositions meet the following requirements:

1. The composition should contain a minimal amount of water so as to avoid corrosion of metal valves and containers for the product, and thereby eliminate product contamination resulting from the corrosion;
2. The composition must be compatible with the halogenated hydrocarbons which are conventionally employed as propellants in aerosol antiperspirant sprays; and
3. The active ingredient must be capable of being dissolved in non-aqueous media (e.g., anhydrous alcohol) in concentrations of at least 10 percent by weight (5 percent by weight in aerosol formulations, which generally contain about 40 to 60 percent volatile propellants).

More recently, complexes meeting the above criteria have been developed which contain a zinc or zirconyl halide or hydroxyhalide, a basic aluminum halide, and a polyhydroxy compound having at least 2 carbon atoms to which are attached at least 2 hydroxy groups. Such complexes are described in U.S. Pat. No. 3,405,153 for "Metal-Aluminum Inorganic-Organic Complexes And Methods Of Preparing Same" issued to John L. Jones and Andrew M. Rubino, and assigned to the same assignees as the present invention. Nevertheless, the present invention represents further attempts to produce even better astringent aluminum compounds. Accordingly, it is an object of the present invention to provide an aluminum compound having a high degree of solubility in anhydrous alcohol and good compatibility with conventional aerosol propellants.

It is a further object of the present invention to provide improved complexes of zinc and zirconium salts with basic aluminum chlorides, which complexes possess good antiperspirant properties.

It is another object of the present invention to provide a method for preparing improved complexes of zinc and zirconium salts with basic aluminum chlorides.

Still another object of the present invention is the provision of zinc halide or zirconyl bromide or hydroxybromide derivatives of Chlorohydrol, which derivatives greatly improve the alcohol solubility and halohydrocarbon compatibility of Chlorhydrol so as to be suitable for usage in aerosol antiperspirant compositions.

Still further objects will appear hereinafter.

The above and other objects are achieved by the complexes of the present invention which are prepared by providing an aqueous solution of five-sixths basic aluminum chloride; mixing with the aqueous solution a compound selected from the group consisting of zinc chloride, zinc bromide, zirconyl bromide, zirconyl hydroxybromide, and mixtures of these compounds, and drying the resulting mixture to produce the complex in the form of a substantially friable solid.

The alcohol soluble complex solids of the present invention may be represented by the following general empirical formula:

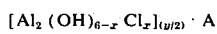 · A in which $x =$ about 0.9 to 1.2, $y =$ about 3 to 20, A is a compound selected from the group consisting of zinc chloride, zinc bromide, zirconyl bromide, zirconyl hydroxybromide, and mixtures of these compounds.

Thus, in the case of the zinc derivatives, the generalized formula will be:

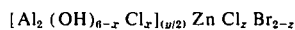

in which $x$ and $y$ are as above and $z = 0$ to 2.

In the case of the zirconyl compounds there is a continuous range of possible values of hydroxy and bromide proportions, ranging from zirconyl bromide (Br/Zr mol ratio equal 2.0) to zirconyl hydroxybromide (Br/Zr mol ratio equal 1.0), since the starting zirconium material is not necessarily a pure compound. When the complex is prepared from zirconyl carbonate and the hydrobromic acid (HBr), the ratio can of course be adjusted as desired, depending on how much HBr is added. Thus, it is believed that the optimum properties may be obtained with an intermediate mixture of the bromide and hydroxybromide. Accordingly, the generalized formula for the zirconium complexes is:

$$[Al_2(OH)_{6-x}Cl_x]_{(y/2)} \cdot ZrO(OH)_{2-z}Br_z$$

in which $x$ and $y$ are as above and $z =$ about 0.9 to 2.

It will be understood that the above formulas are greatly simplified and are intended to include basic aluminum chloride complexes containing coordinated or bound molecules of water. The preferred solid complexes of the present invention will generally have a water content (both free and bound water) of about 12 to 30 weight percent based on the total weight of the solid and determined by Karl Fischer titration.

It should be emphasized that the 12 to 30 weight percent range of water contents is probably somewhat higher than the actual value, since values obtained with the Karl Fischer method are generally higher than obtained by calculation from assays for the metals and halides in the complexes. However, in the presence of aluminum, the assays for zinc and zirconium are somewhat uncertain anyway, and therefore Karl Fischer values for water are used throughout the application rather than calculated values.

The basic aluminum chloride compounds suitable for use in the preparation of the complexes of the present invention include those having one or more units of the following general formula:

$$Al_2(OH)_{6-x}Cl_x$$

wherein $x$ may vary from about 0.9 to about 1.2. The approximately five-sixths basic aluminum chlorides of the above formula have an aluminum to chloride ratio (Al/Cl mol ratio) of about 1.8 to 2.1. It should be understood that the above formula is greatly simplified and is intended to include simple hydrated salts, polymers and other complexes or mixtures, such that the basic formula would be an average consisting of full and/or fractional units.

The basic aluminum chlorides employed in the present invention may be prepared by any of the usual methods known to the art, such as those described in U.S. Pat. No. 2,196,016 issued to Huehn et al. for "Water-Soluble Basic Aluminum Compounds." For example, an aqueous solution of basic aluminum chloride may be made directly (e.g., by the conventional reaction of aluminum metal with $AlCl_3$ or HCl in water solution) to the desired range of Al/Cl ratio or by adding aluminum chloride ($AlCl_3$) to a commercially available solution of aluminum chlorhydroxide (which usually has an Al/Cl ratio of about 2.0) to adjust the Al/Cl ratio to the desired range. From the standpoint of production convenience, it is preferable to start with an aqueous solution of 50 percent aluminum chlorhydroxide, such as the commercially available Chlorhydrol. This solution may then be adjusted to the desired Al/Cl ratio by the addition of an appropriate amount of 32° Baume aluminum chloride.

Since the first step of the method of the present invention comprises the formation of an aqueous solution of a basic aluminum chloride, this may be conveniently achieved simply by using the filtered aqueous product obtained from any of the above-described preparations. The exact concentration of the aqueous basic aluminum chloride solution is not critical and may vary over a considerable range. However, too much water is uneconomical due to the necessity of removing the excess water during the drying step, and too little water may hinder the preparation of the product due to increased viscosity. A suitable aqueous solution contains about 50 weight percent of the basic aluminum chloride.

The zinc or zirconium compounds may be added to the aqueous basic aluminum chloride solution in any convenient manner or form. For example, the zinc chloride ($ZnCl_2$) or zinc bromide ($ZnBr_2$) may be added in their dry crystaline form or as an aqueous solution. The zinc halides may also be easily and relatively cheaply prepared by dissolution of zinc or zinc oxide in hydrochloric acid or hydrobromic acid.

The zirconium compounds are suitably added in the form of aqueous solutions, which preferably contain about 5 to 25 weight percent zirconium. The zirconium compounds can be made by dissolution of commercially available zirconium carbonate paste (carbonated hydrous zirconia) in the appropriate amount of hydrobromic acid.

Unlike the basic aluminum bromide complexes described in our copending application Ser. No. 164,433 for "Zirconium Complexes Of Basic Aluminum Bromides And Methods Of Making same", filed on the same date and assigned to the same assignees as the present invention, zirconyl chloride and zirconyl hydroxychloride have generally not been found to be suitable for making alcohol soluble solid complexes of basic aluminum chlorides according to the methods of the present invention. Thus, the zirconyl hydroxychloride forms a gel with the basic aluminum chlorides, and zirconyl chloride forms a complex which has little or no alcohol solubility.

The addition of the zinc or zirconium compound to the aqueous basic aluminum chloride solution is by simple mixing, and the heating step described in the methods of U.S. Pat. Nos. 2,906,668 and 3,405,153 is generally not required. However, stirring may be preferred in certain cases, and heating to a temperature near reflux (100° C), as in Example VIII, or to lower temperatures for longer periods, may be desirable. Nevertheless, most gelation problems which may occur, particularly with the zirconyl hydroxybromide, may generally be corrected by dilution of the mixture with water or slight heating. Moreover, where zinc and/or zirconyl chloride are added to the aqueous solution, long contact times at elevated temperatures before drying must be avoided to prevent decomposition or other undesirable changes.

The amount of the particular zinc or zirconium compound added to the aqueous chloride solution is also not particularly crucial and may vary over a wide range. It will be obvious to one of ordinary skill in the art that the amount of zinc or zirconium compound to be added will depend upon the particular zinc or zirconium compound employed and the desired amount of zinc or zirconium in the final product.

Preferred aluminum to zirconium or aluminum to zinc mol ratios (hereinafter referred to as Al/Zr and Al/Zn ratios) range between about 3 to 20 (i.e., $y$ in the previous discussed formulas equals about 3 to 20). The value of $y$ could be greater than 20, however such complexes would be approaching the pure basic aluminum chlorides, and as a result the drying and other process conditions might become more critical, as discussed in copending application Ser. No. 84,093 of John L. Jones and Andrew M. Rubino for "Alcohol Soluble Basic Aluminum Chlorides And Method Of Making Same," assigned to the same assignees as the present invention.

Also, products having ratios lower than about 3 can be made, but with generally less satisfactory results. Thus, with Al/Zr ratios much lower than about 3 there are more gelation problems and the products are more acidic, while with Al/Zn ratios much lower than 3 there is a tendency to increase the hygroscopicity of the dried product, which would yield undesirable commercial characteristics.

After the addition of the desired zinc or zirconium compound, the resulting solution mixture is dried to form a friable solid complex having the desired water content. Almost any of the usual drying methods known in the art are acceptable, such as air drying at atmospheric temperature and pressure, vacuum drying, freeze drying or spray drying. Rotary vacuum drying at a maximum temperature of about 40°C. and about 15 millimeters of mercury has been particularly satisfactory, but spray drying is probably the most practicle and economical from a commercial standpoint. Suitable spray drying conditions will depend to a large extent on the particular apparatus employed, and will be readily determinable by one of ordinary skill in the art.

Although the particular quantity of water present in the final solid complex is not critical, lower water contents are preferred due to the potential reduction of corrosion problems. However, care must be exercised to prevent the product from becoming overdried to the point of alcohol insolubility. A suitable range of water contents is about 12 to 30 weight percent as determined by Karl Fischer analysis and based on the total weight of the complex solid. As mentioned above, the actual range of water content will probably be somewhat lower.

A typical preferred solid product of the present invention will have an assay within the following approximate ranges:
15–25% aluminum
3–20% zinc or zirconium
Al/Zn or Al/Zr mol ratio equal 3–20
12–30% water by Karl Fischer Throughout the application all percentages are given as weight percents based on the total weight of the complex solid, unless otherwise specified. The percentages of metal and halide are determined by assays by accepted analytical procedures.

The dried solid complexes of the present invention show good alcohol solubility. For example, virtually all of the products are soluble in anhydrous (SDA-40) alcohol within about 1 to 18 hours to achieve at least a 30 weight percent solution.

Furthermore, the solid complexes of the present invention show good compatibility with the halogenated hydrocarbons, such as those conventionally used as aerosol propellants. Halohydrocarbon compatibility in the present application is measured on the basis of the number of cc's of $CCl_4$ which may be admixed with 60 grams of a 30 weight percent solution of the complex in SDA-40 alcohol before a permanent cloudiness or haze occurs.

Although the halohydrocarbon compatibility varies somewhat depending upon the particular zinc or zirconium compound employed in forming the complexes, the values for all of the complexes of the present invention compare quite favorably with compatibility values for the pure basic aluminum chloride solids. Thus, the solid complexes of the present invention exhibit $CCl_4$ compatibilities in the range from about 50 to 200 cc's, with the zirconyl bromide complexes generally having the highest compatibility, the zinc chloride complexes having the lowest compatibility, and the zinc bromide and zirconyl hydroxybromide complexes and mixtures lying somewhere inbetween. As a comparison, the pure alcohol soluble basic aluminum chloride solids, such as illustrated in copending application Ser. No. 84,093, referred to above, generally have $CCl_4$ compatibilities in the range of about 55 to 75 cc's.

The pH values for the complex solids of the present invention vary depending upon the particular zinc or zirconium complexing salt. For example, the alcoholic pH of 30 weight percent solutions of the zirconyl bromide complexes in SDA-40 alcohol is generally about 1.5, and the corresponding pH values for the zinc complexes are generally higher.

Although applicants do not wish to be bound by any particular theory, it seems certain that the zinc and zirconium compounds form complexes with the basic aluminum chlorides. Thus, in the case of the zinc complexes, the pH of the solution is lower than the pH of any of the components. Also, in the case of the zirconium complexes, the zirconium aluminum solutions are stable at pH values were zirconium alone would precipitate. Furthermore, in view of the improved alcohol solubility and compatibility over the pure basic aluminum chlorides, it is believed that the complexes of the present invention, particularly those formed with the bromide salts of zinc and zirconium, have increased efficacy over the basic aluminum chlorides and approaching the efficacy of the basic aluminum bromides, such as those described in copending application Ser. No. 88,206 of John L. Jones and Andrew M. Rubino for "Basic Aluminum Bromide Compositions," assigned to the same assignees as the present invention.

The alcohol soluble zinc and zirconium complexes of basic aluminum chlorides and the methods of making the solid complexes of the present invention will now be described in more detail with reference to the following specific, non-limiting examples:

EXAMPLE I 10.8 gms $ZnBr_2$ was dissolved in 101.6 gms 50% aluminum chlorhydroxide solution (12.3% Al) giving an Al/Zn ratio of 9.7:1. After being stirred for two days, the solution was dried in a rotary vacuum evaporator at 30°C. and about 15 mm Hg to 58 gms. The product dissolved in anhydrous SDA-40 in less than 90 minutes to form a 30% solution with a $CCl_4$ compatibility of 95 cc. Analysis: 23.0% Al, 5.7% Zn, 18.2% water by Karl Fischer.

EXAMPLE II 160 ml solution containing 94.5 gms $ZnBr_2$ was added to 261 gms 50% aluminum chlorhydroxide (12.2% Al) giving an Al/Zn ratio of 3.0/1. After overnight stirring, 201 gms of solution was dried in a rotary vacuum evaporator at 30°C. and about 15 mm Hg to give 149 gms of solids. The product dissolved in anhydrous SDA-40 in one hour to form a 30% solution with a $CCl_4$ compatibility of 162cc. Analysis: 19.6% Al, 16.1% Zn, 13.0% water by Karl Fischer.

EXAMPLE III 10.2 gms of $ZnCl_2$ was dissolved in 157.3 gms 50% aluminum chlorhydroxide (12.3% Al) producing an Al/Zn ratio of 2.6:1. The solution was dried in a rotary vacuum evaporator at 30°C. and about 15 mm Hg. The product dissolved in anhydrous SDA-40 overnight to form a 30% solution with a $CCl_4$ compatibility of 56 cc. Analysis: 24.8% Al, 6.2% Zn, 18.7% water by Karl Fischer.

EXAMPLE IV

In 155.6 gms of 50% aluminum chlorhydroxide (12.3% Al) was dissolved 32.2 gms of $ZnCl_2$ producing an Al/Zn ratio of 3.0:1. 185 gms of the solution was dried to 101 gms in a rotary vacuum evaporator at 30°C. and about 15 mm Hg. The product dissolved in anhydrous SDA-40 in about 2 hours to form a 30% solution with a $CCl_4$ compatibility of 102 cc. Analysis: 23.7% Al, 19.1% Zn, 14.9% water by Karl Fischer.

EXAMPLE V

To 161 gms of 50% aluminum chlorhydroxide (12.2% Al) was added 24.1 gms of zirconyl bromide solution (13.6% Zr) giving an Al/Zr ratio of 20.2:1. The solution was dried to 93 gms solid in a rotary vacuum evaporator at 30°C. and about 15 mm Hg. The product dissolved in anhydrous SDA-40 in an hour to form a 30% solution with a $CCl_4$ compatibility of 102 cc. Analysis: 20.7% Al, 3.5% Zr, 25.7% water by Karl Fischer.

EXAMPLE VI 68.8 gms of zirconyl bromide solution (13.6% Zr) was added to 132.7 gms of 50% aluminum chlorhydroxide (12.3% Al) giving an Al/Zr ratio of 5.9:1. The solution was dried to 100 gms solid in a rotary vacuum evaporator at 30°C. and about 15 mm Hg. The product dissolved in anhydrous SDA-40 in about 4 hours to form a 30% solution with a $CCl_4$ compatibility of 181 cc $CCl_4$. Analysis: 16.0% Al, 9.2% Zr, 24.5% water by Karl Fischer.

EXAMPLE VII

To 2268 gms of 50% aluminum chlorhydroxide (12.2% Al) was added 342.1 gms of zirconyl bromide (13.6% Zr) and 217.2 gms of zirconyl hydroxybromide (21.7% Zr) giving an Al/Zr ratio of 10.0:1. After overnight stirring, the solution was dried in a spray dryer with an outlet temperature of 200°F. The product dissolved in anhydrous SDA-40 overnight to form a 30% solution with a $CCl_4$ compatibility of 164 cc. Analysis: 19.6% Al, 6.6% Zr, 21.4% water by Karl Fischer.

EXAMPLE VIII

To 142 gms of 50% aluminum chlorhydroxide (12.3% Al) was added 31.4 gms zirconyl hydroxybromide (21.7% Zr) giving an Al/Zr ratio of 8.7:1. The mixture was heated for 30 minutes to break up a gel and stirred overnight. Then the solution was dried to 85 gms in a rotary vacuum dryer at 30°C. and 15 mm Hg. The product dissolved in anhydrous SDA-40 overnight to form a 30% solution with a $CCl_4$ compatibility of 88 cc. Analysis: 19.4% Al, 7.5% Zr, 23.8% water by Karl Fischer.

EXAMPLE IX 25.9 gms of zirconyl hydroxybromide was added to 191.5 gms of 50% dried aluminum chlorhydroxide (12.2% Al) giving an Al/Zr ratio of 14.0:1. After being stirred for two days, the sample was dried to 114 gms product in a rotary vacuum evaporator at 30°C. and about 15 mm Hg. The product dissolved in anhydrous SDA-40 in two hours to form a 30% solution with a $CCl_4$ compatibility of 64 cc. Analysis: 20.0% Al, 4.8% Zr, 27.5% water by Karl Fischer.

The complexes of the present invention are useful in antiperspirant and other cosmetic applications, and particularly aerosol antiperspirant sprays. Such aerosol antiperspirant formulations comprise a non-toxic dermatologically acceptable nonaqueous solvent, such as anhydrous ethanol, and about 40 to 60 weight percent of a fluorocarbon propellant such as Freon 12, Freon 114, Freon 22, Freon 113, etc. Other suitable solvents and propellants will be readily apparent to one of ordinary skill in the art. For example, a list of suitable substitutes is presented in column 9 of U.S. Pat. No. 3,405,153. The solid complexes should be present to the extent of at least 5 weight percent of the total aerosol formulation. Since the volatile propellants are dissipated immediately upon application, such a concentration will yield an effective concentration of at least 10 weight percent based on the non-aqueous solvent. Of course, due to the excellent carbon tetrachloride compatibilities of the complexes of the present invention, even higher concentrations may be used, thus yielding higher concentrations of the active ingredients.

As example of aerosol antiperspirant formulations, three batches were prepared using the complexes prepared according to Examples II, IV, and VI above. The three batches are listed below in Table I.

TABLE I

| Components of Formulation Examples | Weight Percentages of Each Component | | |
|---|---|---|---|
| Complex from Example: | II | IV | VI |
| Concentration of Complex | 9.0 | 7.0 | 11.0 |
| Stearic Acid | 1.0 | 1.0 | 2.0 |
| Hexadecyl Aclohol | | | 1.0 |
| Silicone Fluid 1066 (General Electric) | 2.0 | 1.0 | 1.0 |
| Isopropyl Myristate | | 1.0 | |
| SDA-40 | 38.0 | 40.0 | 35.0 |
| Dichlorotetrafluoroethane | 30.0 | 30.0 | 30.0 |
| Dichlorodifluoromethane | 20.0 | 20.0 | 20.0 |

All three of the formulations shown in Table I exhibited good stability, (i.e., lack of gelation tendencies) after 1 week at ambient temperatures.

The present invention may be embodied in other specific forms without departing from the spirit or essential attributes thereof and, accordingly, reference should be made to the appended claims, rather than to the foregoing specification as indicating the scope of the invention.

We claim:

1. A method of preparing alcohol soluble solid complexes of five-sixths basic aluminum chlorides comprising the steps of providing an aqueous solution of five-sixths basic aluminum chloride having the general empirical formula:

$$Al_2(OH)_{6-x}Cl$$

in which $x$ equals about 0.9 to 1.2; adding to said aqueous solution a substance selected from the group consisting of zinc chloride, zinc bromide and combinations of said zinc halides which zirconyl bromide and/or zirconyl hydroxybromide; and drying the resulting mixture to a substantially friable solid.

2. Alcohol soluble complex solids formed by the method of claim 1.

3. A method according to claim 1 wherein said mixture is dried to a water content of about 12 to 30 weight percent determined by Karl Fischer analysis and based on the total weight of the solid.

4. A method according to claim 1 wherein said mixture is vacuum dried at a maximum temperature of about 40° C.

5. A method according to claim 1 wherein said mixture is spray dried.

6. Alcohol soluble complexes of five-sixths basic aluminum chlorides formed by the method of claim 1 wherein the Al/Zn or Al/Zr mol ratio is about 3:1 to 20:1.

7. Alcohol soluble complexes of five-sixths basic aluminum chlorides formed by the method of claim 1 and having a halohydrocarbon compatibility of at least 50 cc's of $CCl_4$, when the $CCl_4$ is admixed with 60 grams of a 30 weight percent solution of said complex in SDA-40 alcohol, before a permanent cloudiness occurs.

8. Alcohol soluble complexes of five-sixths basic aluminum chlorides formed by the method of claim 4.

9. Alcohol soluble complex solids according to claim 2 wherein said solids have a water content of about 12 to 30 weight percent determined by Karl Fischer analysis and based on the total weight of the solid.

* * * * *